(12) United States Patent
Kozaki et al.

(10) Patent No.: US 10,464,138 B2
(45) Date of Patent: Nov. 5, 2019

(54) TOOL HOLDER AND MANUFACTURING METHOD THEREOF

(71) Applicant: DENSO CORPORATION, Kariya, Aichi-pref. (JP)

(72) Inventors: Yoshiyasu Kozaki, Kariya (JP); Hisatoshi Kojima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 61 days.

(21) Appl. No.: 15/543,595

(22) PCT Filed: Feb. 1, 2016

(86) PCT No.: PCT/JP2016/000479
§ 371 (c)(1),
(2) Date: Jul. 14, 2017

(87) PCT Pub. No.: WO2016/129229
PCT Pub. Date: Aug. 18, 2016

(65) Prior Publication Data
US 2018/0326503 A1  Nov. 15, 2018

(30) Foreign Application Priority Data

Feb. 10, 2015 (JP) .................. 2015-024310
Nov. 17, 2015 (JP) .................. 2015-224777

(51) Int. Cl.
*B23B 29/02* (2006.01)
*B23B 51/10* (2006.01)
(Continued)

(52) U.S. Cl.
CPC .......... *B23B 29/022* (2013.01); *B22F 3/1055* (2013.01); *B23B 29/03* (2013.01);
(Continued)

(58) Field of Classification Search
CPC ....... B23B 29/022; B23B 29/03; B23B 27/02; B23B 2250/04; B23B 2250/08;
(Continued)

(56) References Cited

U.S. PATENT DOCUMENTS

| | | | | |
|---|---|---|---|---|
| 5,137,397 A | * | 8/1992 | Koketsu | B23B 51/102 29/566 |
| 6,782,779 B2 | * | 8/2004 | Steagall | B23B 29/03407 82/1.11 |
| 2016/0193666 A1 | * | 7/2016 | Haimer | B22F 3/1055 279/4.03 |

FOREIGN PATENT DOCUMENTS

| | | | | |
|---|---|---|---|---|
| JP | 02116404 A | * | 5/1990 | ............. B23B 41/00 |
| JP | 08300206 A | * | 11/1996 | |

(Continued)

*Primary Examiner* — Sunil K Singh
*Assistant Examiner* — Chwen-Wei Su
(74) *Attorney, Agent, or Firm* — Harness, Dickey & Pierce, P.L.C.

(57) ABSTRACT

A tool holder holds a cutting tool that cuts a workpiece while revolving about a rotational axis. The tool holder has a fixed part and a cutting part. The fixed part is held by a main shaft of a machine tool. The cutting part is provided integrally with the fixed part and has an asymmetric shape with respect to the rotational axis. The cutting tool is attached to the cutting part. The cutting part has a one-side part and an other-side part. The one-side part has a largest protruding amount from the rotational axis in the cutting part when viewed from an axial direction. The other-side part is located on a side of the rotational axis opposite to the one-side part. A bulk density of the one-side part is smaller than a bulk density of the other-side part.

10 Claims, 15 Drawing Sheets

(51) Int. Cl.
  *B22F 3/105* (2006.01)
  *B23B 29/03* (2006.01)
  *B33Y 80/00* (2015.01)
  *B33Y 10/00* (2015.01)
  B23B 27/00 (2006.01)
  B23Q 11/00 (2006.01)
  B22F 3/00 (2006.01)

(52) U.S. Cl.
  CPC ............ *B23B 51/102* (2013.01); *B33Y 10/00* (2014.12); *B33Y 80/00* (2014.12); *B22F 3/008* (2013.01); *B22F 2999/00* (2013.01); *B23B 27/002* (2013.01); *B23B 2250/04* (2013.01); *B23Q 11/0003* (2013.01); *Y02P 10/295* (2015.11)

(58) Field of Classification Search
  CPC ............ B23B 2250/12; B23B 2250/16; B23Q 11/0003; B23Q 11/0035; Y10T 408/5621
  See application file for complete search history.

(56) References Cited

FOREIGN PATENT DOCUMENTS

| | | | |
|---|---|---|---|
| JP | 2002154003 A | | 5/2002 |
| JP | 2011194482 A | | 10/2011 |
| JP | 2011212772 A | * | 10/2011 |

* cited by examiner

TOOL HOLDER AND MANUFACTURING METHOD THEREOF

CROSS REFERENCE TO RELATED APPLICATIONS

This application is a U.S. National Phase Application under 35 U.S.C. 371 of International Application No. PCT/JP2016/000479 filed on Feb. 1, 2016 and published in Japanese as WO 2016/129229 A1 on Aug. 18, 2016. This application is based on and claims the benefit of priority from Japanese Patent Application No. 2015-024310 filed on Feb. 10, 2015 and Japanese Patent Application No. 2015-224777 filed on Nov. 17, 2015. The entire disclosures of all of the above applications are incorporated herein by reference.

TECHNICAL FIELD

The present disclosure relates to a tool holder.

BACKGROUND ART

As disclosed in Patent Literature 1 etc., a tool holder is known to hold a cutting tool that cuts a workpiece while rotating around a rotational axis. The tool holder has a fixed part that is held by a main shaft of a machine tool such as a machining center and a cutting part to which a cutting tool is attached.

PRIOR ART LITERATURES

Patent Literature

Patent Literature 1: JP 2011-194482 A

SUMMARY OF INVENTION

The tool holder used for a work such as boring or forming may have the tool holder that protrudes toward one side in a radial direction centering on the rotational axis. In this case, a shape of the cutting part becomes asymmetric with respect to the rotational axis, and thereby a center of gravity of the tool holder on a condition of holding the cutting part is distanced from the rotational axis. Accordingly, a dynamic balance of the tool holder may be lost, and the tool holder may cause a vibration when being operated, and thereby a processing accuracy may deteriorate.

The present disclosure addresses the above-described issues, and it is an objective of the present disclosure to provide a tool holder that can improve a processing accuracy.

According to a first aspect of the present disclosure, a tool holder holds a cutting tool that cuts a workpiece while revolving about a rotational axis. The tool holder has a fixed part and a cutting part. The fixed part is held by a main shaft of a machine tool. The cutting part is provided integrally with the fixed part and has an asymmetric shape with respect to the rotational axis. The cutting tool is attached to the cutting part. The cutting part has a one-side part and an other-side part. The one-side part has a largest protruding amount from the rotational axis in the cutting part when viewed from an axial direction. The other-side part is located on a side of the rotational axis opposite to the one-side part. A bulk density of the one-side part is smaller than a bulk density of the other-side part. According to the above-described configuration, a center of gravity of the tool holder on a condition of the cutting tool approaches to the rotational axis.

Alternatively, according to a second aspect of the present disclosure, a tool holder that holds a cutting tool that cuts a workpiece while revolving about a rotational axis. The tool holder has a fixed part and a cutting part. The fixed part is held by a main shaft of a machine tool. The cutting part is provided integrally with the fixed part and has an asymmetric shape with respect to the rotational axis. The cutting tool is attached to the cutting part. The tool holder on a condition of holding the cutting tool has a virtual center of gravity when estimating that the fixed part and the cutting part are solid. The cutting part has balance adjustment holes that are provided to adjust an actual center of gravity of the tool holder on the condition of holding the cutting tool to be closer to the rotational axis as compared to the virtual center of gravity.

According to the second aspect of the present disclosure, the dynamic balance of the tool holder is adjusted to moderate an imbalance of the tool holder. As a result, the vibration of the tool holder when the tool holder on the condition of holding the cutting tool rotates about the rotational axis can be suppressed. Therefore, the processing accuracy can be prevented from deteriorating due to the vibration.

A manufacturing method of a tool holder according to the present disclosure is for manufacturing a tool holder that has a fixed part and a cutting part. The fixed part is held by a main shaft of a machine tool. The cutting part is provided integrally with the fixed part and has an asymmetric shape with respect to a rotational axis. A cutting tool is attached to the cutting part. The cutting part has a one-side part and an other-side part. The one-side part has a largest protruding amount from the rotational axis in the cutting part when viewed from an axial direction. The other-side part is located on a side of the rotational axis opposite to the one-side part. The one-side part of the cutting part has at least one of a hole that is open on an outer surface of the one-side part and an enclosed void that is closed to outside. A bulk density of the one-side part of the cutting part is smaller than a bulk density of the other-side part. The cutting part is molded using a 3D printer. The hole and the enclosed void are provided simultaneously at the same time as the cutting part is molded.

Here, "bulk" of an object is a sum of a volume of the object, a volume of a hole provided with the object and being open on a surface of the object, and a volume of a void provided in the object and being closed to outside. "Bulk density" is a value that is calculated by dividing a mass of the object by the bulk.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
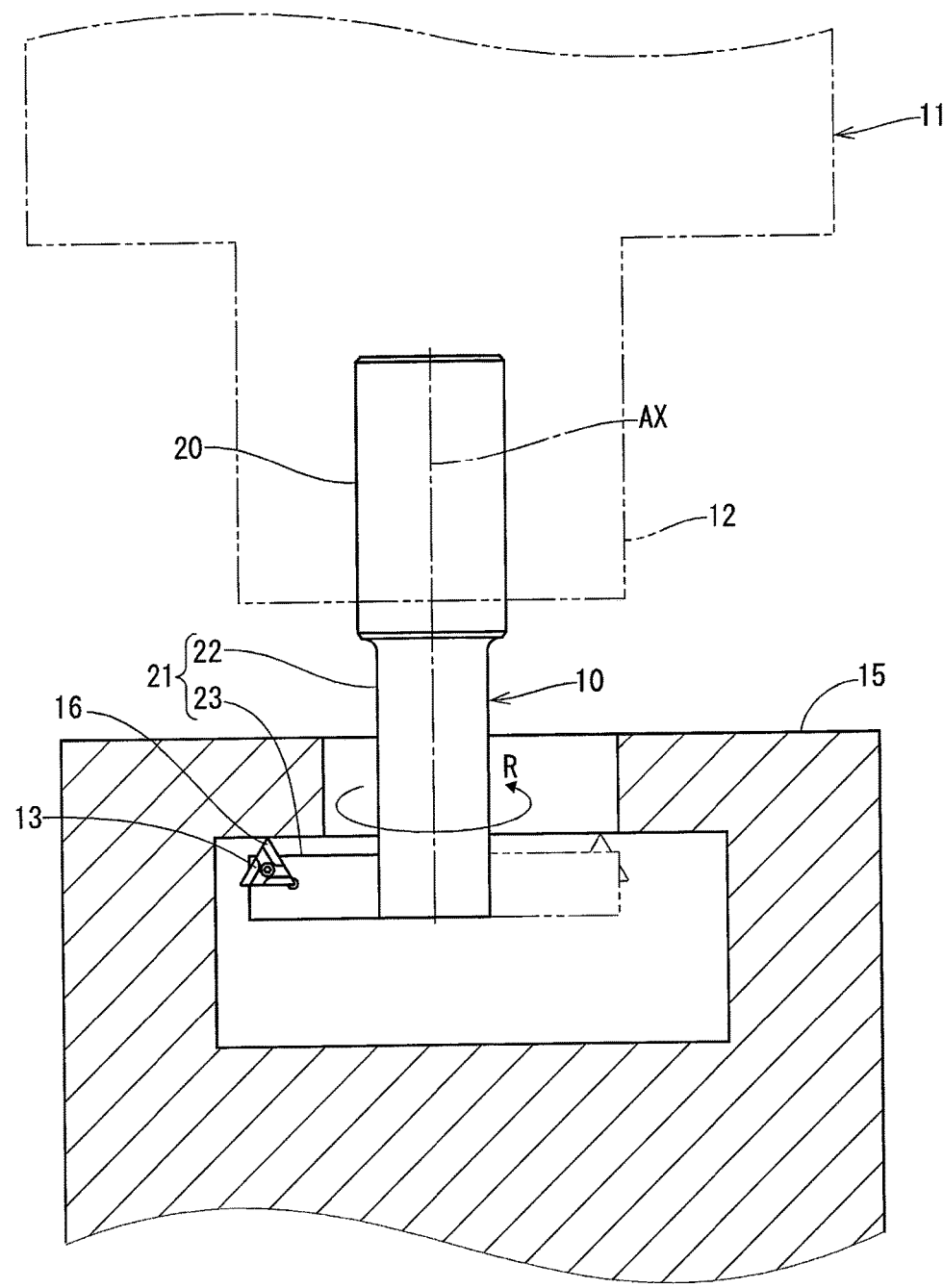
FIG. 1 is a schematic diagram illustrating a tool holder on a condition of being attached to a main shaft of a machine tool, according to a first embodiment.

A first embodiment will be described hereafter referring to FIG. 1 to FIG. 6. A tool holder 10 according to the first embodiment is shown in FIG. 1. The tool holder 10 is attached to a main shaft 12 of a machine tool 11. The main shaft 12 is a rotation object shaft that is operated to rotate about a specified rotational axis AX.

A cutting tool 13 is attached to the tool holder 10. According to the present embodiment, the cutting tool 13 is a replaceable blade, i.e., a throw-away tool. The cutting tool 13 is held by the tool holder 10 and cuts, using an edge 16, a workpiece 15 while revolving about the rotational axis AX in conjunction with a rotation of the tool holder 10. FIG. 1 shows a condition that the tool holder 10 on a condition of holding the cutting tool 13 is used for boring.

As shown in FIG. 1 through FIG. 6, the tool holder 10 has a fixed part 20 and a cutting part 21. The fixed part 20 and the cutting part 21 are made of the same material, i.e., metal, and are provided integrally with each other. According to the present embodiment, the fixed part 20 and the cutting part 21 may be made of ferrous metal. The fixed part 20 is held by the main shaft 12 (refer to FIG. 1) and has a columnar shape.

Figure 2:
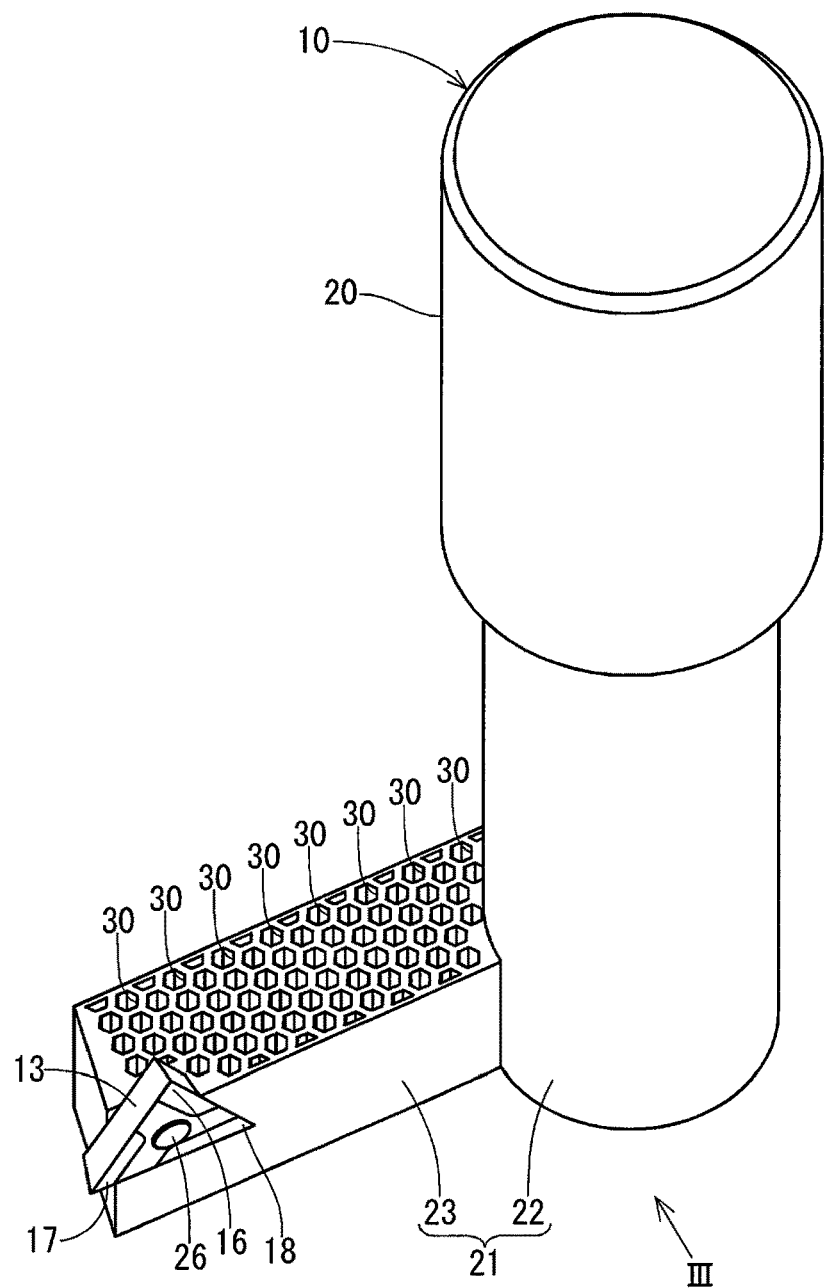
FIG. 2 is a perspective diagram illustrating the tool holder shown in FIG. 1 on a condition of holding a cutting tool.
Figure 3:
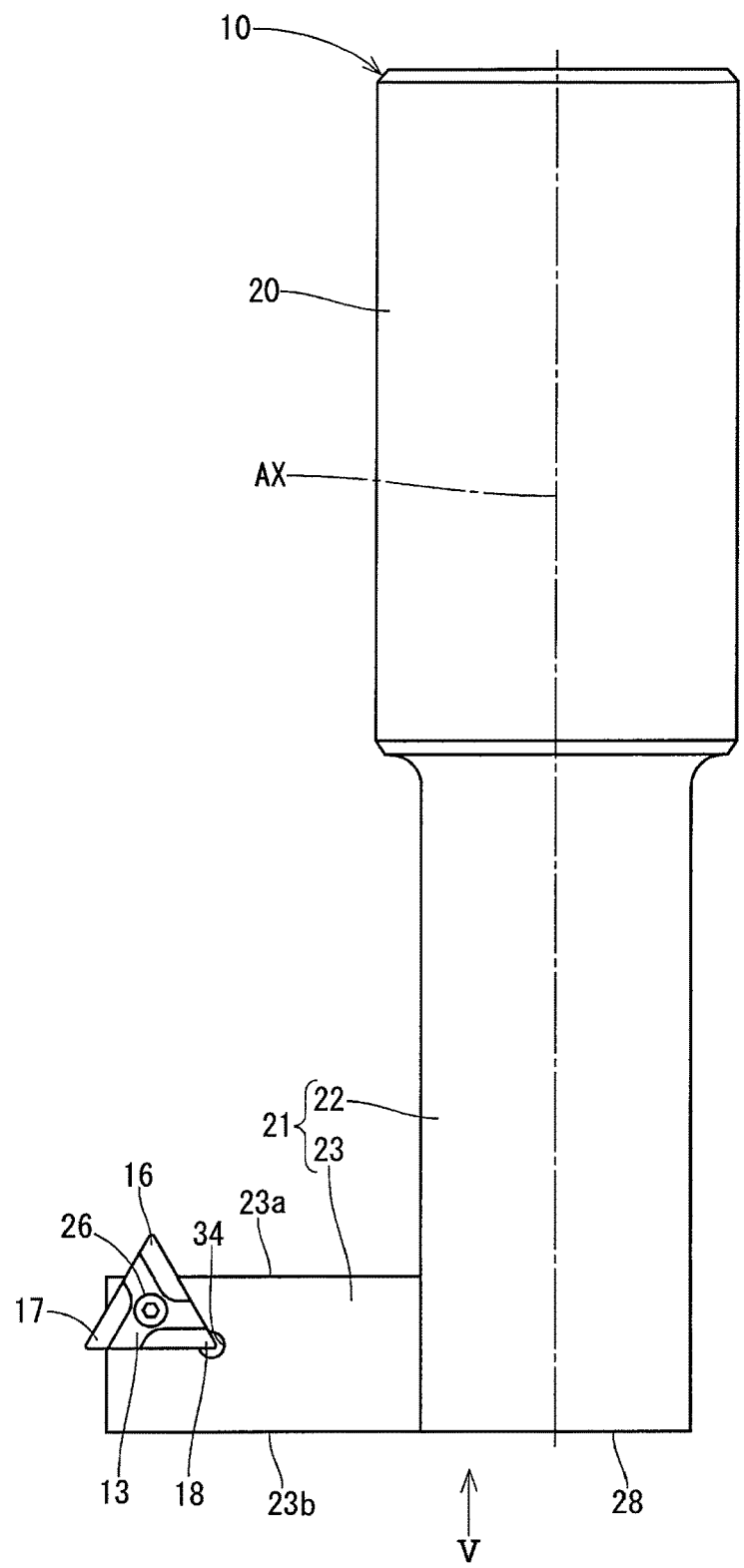
FIG. 3 is a diagram illustrating the tool holder on the condition of the cutting tool when viewed from a direction III shown in FIG. 2.

As shown in FIG. 2, the cutting part 21 has a shaft 22 and a protruding part 23. The shaft 22 extends from the fixed part 20 in an axial direction (refer to FIG. 3). The protruding part 23 protrudes radial outward from an end part of the shaft 22 on a side opposite to the fixed part 20. A quantity of the protruding part 23 is one according to the present embodiment. As shown in FIG. 3, the protruding part 23 has a first surface 23a and a second surface 23b facing each other in the axial direction.

The protruding part 23 has a tip part, and the tip part has a wall on a rotational front side in a rotational direction R (refer to FIG. 1 and FIG. 5) of the tool holder 10. The tip part is provided with a recessed part 24. The recessed part 24 is open both in the axial direction toward a side adjacent to the fixed part 20 and in a radial direction outward. The cutting tool 13 fits to the recessed part 24. The cutting tool 13 is fixed to the protruding part 23 by a screw 26 that is threaded into a screw hole 25 provided in a bottom of the recessed part 24.

The cutting tool 13 has three edges 16, 17, 18. As shown in FIG. 3, the edge 16 protrudes from the first surface 23a of the protruding part 23 in the axial direction. According to the present embodiment, "the edge cutting the workpiece" is the edge 16. The edge 17 extends radial outward from the protruding part 23. The edge 18 is housed in the recessed part 24. The recessed part 24 has a corner at a location corresponding to the edge 18, and the corner is provided with a release hole 34 that prevents the edge 18 from being in contact with the tool holder 10.

When the edge 16 outlives its usefulness, the edge 17 or the edge 18 can take charge of cutting in a manner that the cutting tool 13 is rotated and attached to the cutting part 21 again. For example, the edge 17 functions as "the edge cutting the workpiece" when the cutting tool 13 rotates clockwise from a state shown in FIG. 3.

The cutting tool 13 is disposed to protrude toward one side in the radial direction with respect to the rotational axis AX. In other words, the cutting tool 13 is located on one side of the rotational axis AX in the radial direction such that one of the three edges 16, 17, 18 protrudes radial outward from the protruding part 23 of the cutting part 21. The cutting part 21 is configured to corresponding to the above-described arrangement of the cutting tool 13, and thereby having an asymmetric shape with respect to the rotational axis AX.

Figure 4:
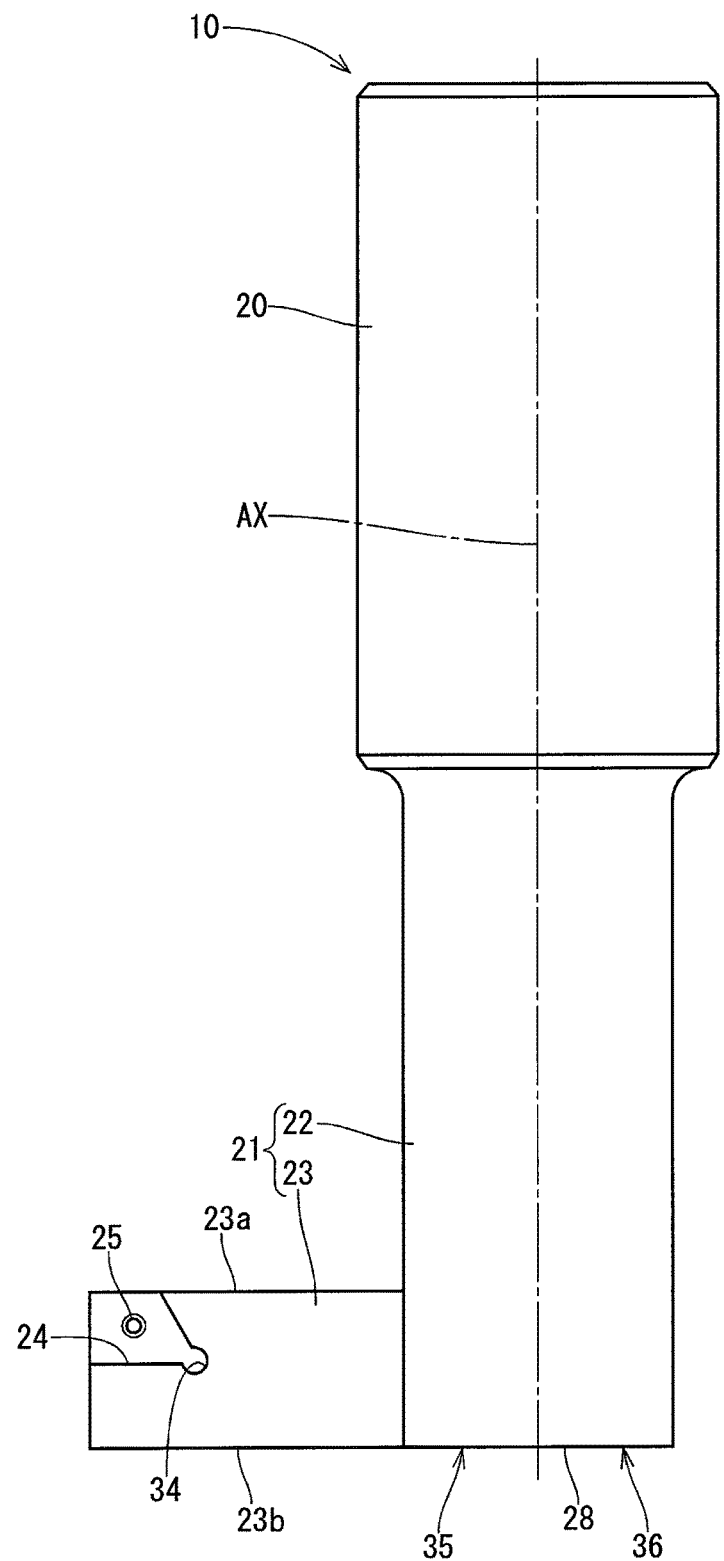
FIG. 4 is a diagram illustrating only the tool holder shown in FIG. 3.
Figure 5:
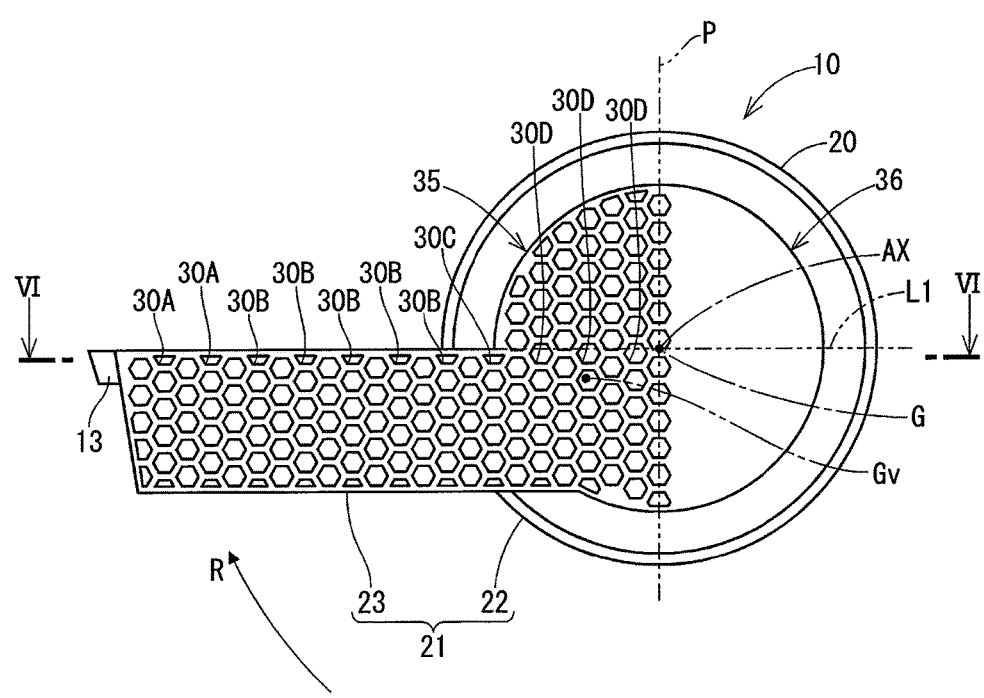
FIG. 5 is a diagram illustrating the tool holder on the condition of holding the cutting tool when viewed from a direction V shown in FIG. 3.
Figure 6:
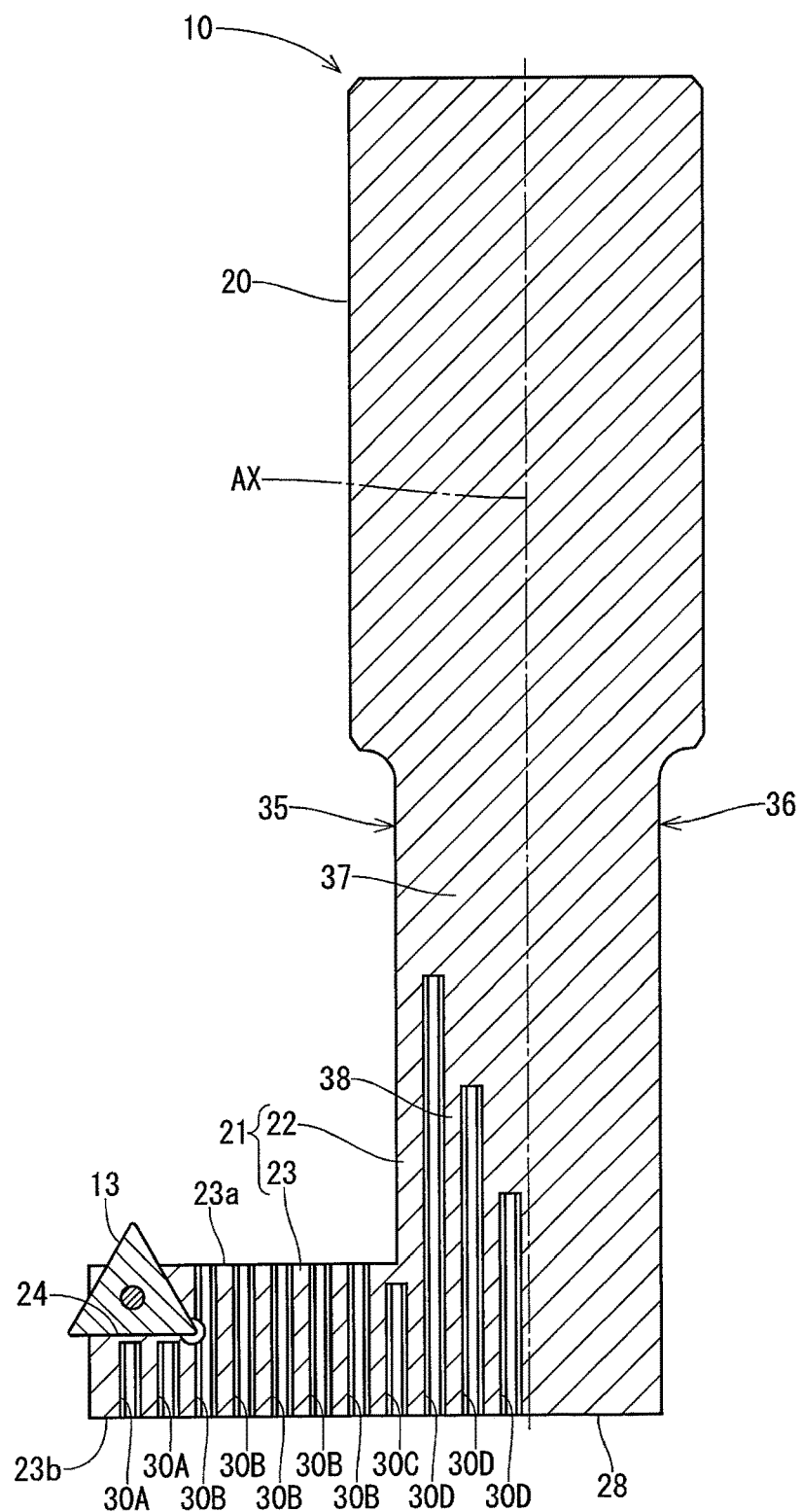
FIG. 6 is a cross-sectional view taken along a line VI-VI shown in FIG. 5.

In the following descriptions, a part of the cutting part 21 that has a largest protruding amount from the rotational axis AX when viewed in the axial direction will be referred to as "one-side part 35", and a part of the cutting part 21 that is located on a side of the rotational axis AX opposite to the one-side part 35 will be referred to as "other-side part 36" (refer to FIG. 4). In other words, "the one-side part 35" is a part of the cutting part 21 that has the largest protruding amount from the rotational axis AX in the radial direction, and "the other-side part 36" is a part of the cutting part 21 that is located on the side of the rotational axis AX opposite to the one-side part 35. According to the present embodiment, a part of the cutting part 21 that is furthermost from the rotational axis AX when viewed in the axial direction is a tip of the cutting part 21. In other words, the part of the cutting part 21 having the largest protruding amount from the rotational axis AX in the radial direction, i.e., the part at which a distance from the rotational axis AX to the part is the longest in the cutting part 21, is a radial outer end of the protruding part 23. As shown in FIG. 5, a virtual plane P is defined as a plane that is perpendicular to a virtual line L1 connecting the radial outer end of the protruding part 23 and the rotational axis AX and that passes the rotational axis AX. The one-side part 35 is located on one side of the virtual plane P and includes the tip of the cutting part 21. The other-side part 36 is located on the other side of the virtual plane P opposite to the one-side part 35.

Here, it is defined that the tool holder 10 on a condition of holding the cutting tool 13 has a virtual center Gv of gravity when estimating that the fixed part 20 and the cutting part 21 are solid. When it is said that an object is "solid", it means that all of a hole provided in the object and being open on an outer surface of the object and a void provided in the object and being closed to outside are filled with metal that is the same metal making the tool holder 10. In addition, it is defined that the tool holder 10 has an actual center G of gravity when the tool holder 10 is on the condition of holding the cutting tool 13.

A bulk of the one-side part 35 is larger than a bulk of the other-side part 35 for the protruding part 23. On the other hand, the one-side part 35 has holes 30A, 30B, 30C, 30D that are open on an outer surface of the cutting part 21. Accordingly, a bulk density of the one-side part 35 is smaller than a bulk density of the other-side part 36. Therefore, the actual center G of gravity is closer to the rotational axis AX as compared to the virtual center Gv of gravity. That is, a distance between the rotational axis AX and the actual center G of gravity is shorter than a distance between the rotational axis AX and the virtual center Gv of gravity. According to the present embodiment, the actual center G of gravity is located on the rotational axis AX. In other words, the cutting part 21 has the holes 30A, 30B, 30C, 30D as "balance adjustment holes" that are provided to adjust the actual center G of gravity to be closer to the rotational axis AX as compared to the virtual center Gv of gravity. In the following descriptions, the holes 30A, 30B, 30C, 30D will collectively mean "a hole 30" when it is not necessary to distinguish the holes 30A, 30B, 30C, 30D from each other.

The hole 30A is located in the protruding part 23 such that a whole length of the hole 30A in the radial direction and all circumferences of the hole 30A overlap with the recessed part 24 when viewed in the axial direction. That is, the hole 30A is located in a tip area of the protruding part 23 on the rotational front side in the rotational direction R. The hole 30A is located on a side of the recessed part 24 opposite to the fixed part 20 in the axial direction. The hole 30A is a bottomed hole extending in the axial direction from the second surface 23B toward the recessed part 24. The second surface 23b is a surface of the protruding part 23 located on a side opposite to the fixed part 20. The hole 30A is located adjacent to the cutting tool 13 so as to release heat transmitted from the cutting part 13 to the cutting part 21.

The hole 30B is located in the protruding part 23 such that at least one of a point of the hole 30B in the radial direction and a point of all circumferences of the hole 30B is not overlap with the recessed part 24 when viewed in the axial direction. That is, the hole 30B is located in a rotational rear area of the protruding part 23 in the rotational direction R, an intermediate area of the protruding part 23 in the rotational direction R, or a bottom area of the protruding part 23. The hole 30B is a through hole extending in the axial direction from the second surface 23b of the protruding part 23 to the first surface 23a of the protruding part 23 on a side adjacent to the fixed part 20. More than one of the hole 30B are located in the tip part of the protruding part 23 to be adjacent to the cutting tool 13 so as to release heat transmitted from the cutting tool 13 to the cutting part 21.

The hole 30C is provided in a boundary area between the shaft 22 and the protruding part 23. The hole 30C is a bottomed hole extending in the axial direction from a surface 28 of the shaft 22. The surface 28 is a surface of the shaft 22 on the side opposite to the fixed part 20.

The hole 30D is provided in a part of the shaft 22 included in the one-side part 35. The hole 30D is a bottomed hole extending in the axial direction from the surface 28 of the shaft 22. When more than one of the hole 30D are provided, lengths of the holes 30D in the axial direction decrease as approaching the rotational axis AX.

The part of the shaft 22 included in the one-side part 35 has a dense part 37 and a sparse part 38. A bulk density of the dense part 37 is the same as the bulk density of the other-side part 36. A bulk density of the sparse part 38 is smaller than the bulk density of the dense part 37. The other-side part 36 and the dense part 37 have no hole and no void and are a solid made of metal. On the other hand, the sparse part 38 is provided with the hole 30D, and thereby being defined as a part that is not solid made of metal, i.e., a part having a void inside. According to the present embodiment, a length of the sparse part 38 in the axial direction increases as being away from the rotational axis AX in the radial direction.

As shown in FIG. 5, a shape of the hole 30 when viewed in a direction in which the hole 30 extends, i.e., a shape of the hole in a transverse cross-section, is not a round shape. That is, the hole 30 is a hole that cannot be provide by a single lunge using a drill.

According to the present embodiment, the shape of the hole in the transverse cross-section is a hexagonal shape. The holes 30 are arranged such that planes of the inner walls of the holes 30 are arranged side by side. As a result, the part of the cutting part 21 provided with the holes 30 has a honeycomb structure.

According to the present embodiment, the edge 16 cutting the workpiece 15 protrudes from the first surface 23a of the protruding part 23 in the axial direction, and the holes 30 extend in a direction substantially coincides with a direction of action in which a load is applied to the cutting part 21 when cutting the workpiece 15. That is, the cutting part 21 has a structure integrally provided with hollow columns that extend in the direction substantially coincides with the direction of action in which the load is applied to the cutting part 21.

A manufacturing method of the tool holder 10 will be described hereafter.

The tool holder 10 is formed using a 3D printer. Specifically, a process (i.e., a powder sintering) in which a layer of fine metal powder spread flatly is baked by laser irradiation is repeated such that the tool holder 10 is molded three dimensionally. The holes 30 are provided simultaneously with the cutting part 21 by the 3D printer. The tool holder is formed using the 3D printer in the following embodiments as well.

Effects of the present embodiment will be described hereafter.

As described above, the tool holder 10 has the fixed part 20 and the cutting part 21 according to the first embodiment. The fixed holder 20 is held by the main shaft 12 of the machine tool 11. The cutting part 21 is provided integrally with the fixed part 20 and has an asymmetric shape with respect to the rotational axis AX. The cutting tool 13 is attached to the cutting part 21. The bulk density of the one-side part 35 of the cutting part 21 is smaller than a bulk density of the other-side part 36 of the cutting part 21.

The dynamic balance of the tool holder 10 is adjusted to repair imbalance in a manner that the actual center G of gravity of the tool holder 10 on the condition of holding the cutting tool 13 is adjusted to be closer to the rotational axis AX. According to the present embodiment, the actual center G of gravity is located on the rotational axis AX. Therefore, a vibration of the tool holder 10 caused when the tool holder 10 on the condition of holding the cutting tool 13 rotates about the rotational axis AX can be suppressed. As a result, a deterioration of the processing accuracy due to the vibration can be suppressed.

According to the first embodiment, the cutting part 21 has the holes 30 that are provided to adjust the actual center G of gravity of the tool holder 10 on the condition of holding the cutting tool 13 to be closer to the rotational axis AX as compared to the virtual center Gv of gravity.

Therefore, a vibration of the tool holder 10 caused when the tool holder 10 on the condition of holding the cutting tool 13 rotates about the rotational axis AX can be suppressed. As a result, a deterioration of the processing accuracy due to the vibration can be suppressed.

In addition, the cutting part 21 has the shaft 22 and the protruding part 23 that protrudes outward from the shaft in the radial direction, according to the first embodiment. The shaft 22 has a part included in the one-side part 35. The part of the shaft 22 has the dense part 37 and the sparse part 38. The dense part 37 has the same bulk density as the other-side part 36. The bulk density of the sparse part 38 is smaller than the bulk density of the dense part 37. The length of the sparse part 38 in the axial direction increases as being distanced away from the rotational axis AX in the radial direction. According to the present embodiment, the lengths of the holes 30 in the axial direction increase as being distanced away from the rotational axis AX in the radial direction. Since the length of the sparse part 38 in the axial direction is not even as described above, the actual center G of gravity can be set to be located closer to the rotational axis AX.

The one-side part 35 has the hole 30 that are open on the outer surface of the on-side part 35 in the axial direction, according to the first embodiment.

Accordingly, the bulk density of the one-side part 35 can be set smaller than the bulk density of the other-side part 36.

The cutting tool 13 has the cutting edge 16 cutting the workpiece 15 and is attached to the cutting part 21 such that the cutting edge 16 protrudes from the first side surface 23a of the protruding part 23 in the axial direction. The holes 30 extend in the axial direction. That is, the cutting part 21 has the structure integrally provided with the hollow columns that extend in the direction substantially coincides with the direction of action in which the load is applied to the cutting part 21. As a result, a stiffness of the cutting part 21 for enduring the load can be increased.

The holes 30 include the hole 30A and the hole 30B according to the first embodiment. The hole 30B is located in the tip part of the protruding part 23. The hole 30A and the hole 30B are located adjacent to the cutting tool 13 so as to release heat transmitted from the cutting part 13 to the cutting part 21. As a result, a heat releasing performance of the cutting part 21 can be improved.

The part of the cutting part 21 provided with the holes 30 has a honeycomb structure according to the first embodiment. As a result, the tool holder 10 can certainly have a sufficient stiffness for enduring the load applied to the tool holder 10 when cutting the workpiece 15, although the tool holder 10 has the holes 30.

The holes 30 have the hexagonal shape in the transverse cross-section according to the first embodiment. As a result, an increase of the stiffness of the tool holder 10 and a reduction of the weight of the tool holder 10 can be achieved at the same time.

The tool holder 10 (i.e., the fixed part 20 and the cutting part 21) is formed using the 3D printer according to the first embodiment. The holes 30 are provided simultaneously with the cutting part 21 by using the 3D printer. As a result, the holes 30 can be provided easily even if the holes 30 are a hole that cannot be provide by a single lunge using a drill. Furthermore, the holes 30 are not necessary to be provided in a different process after forming the fixed part 20 and the cutting part 21, thereby manufacturing man-hour can be reduced.

Second Embodiment

Figure 7:
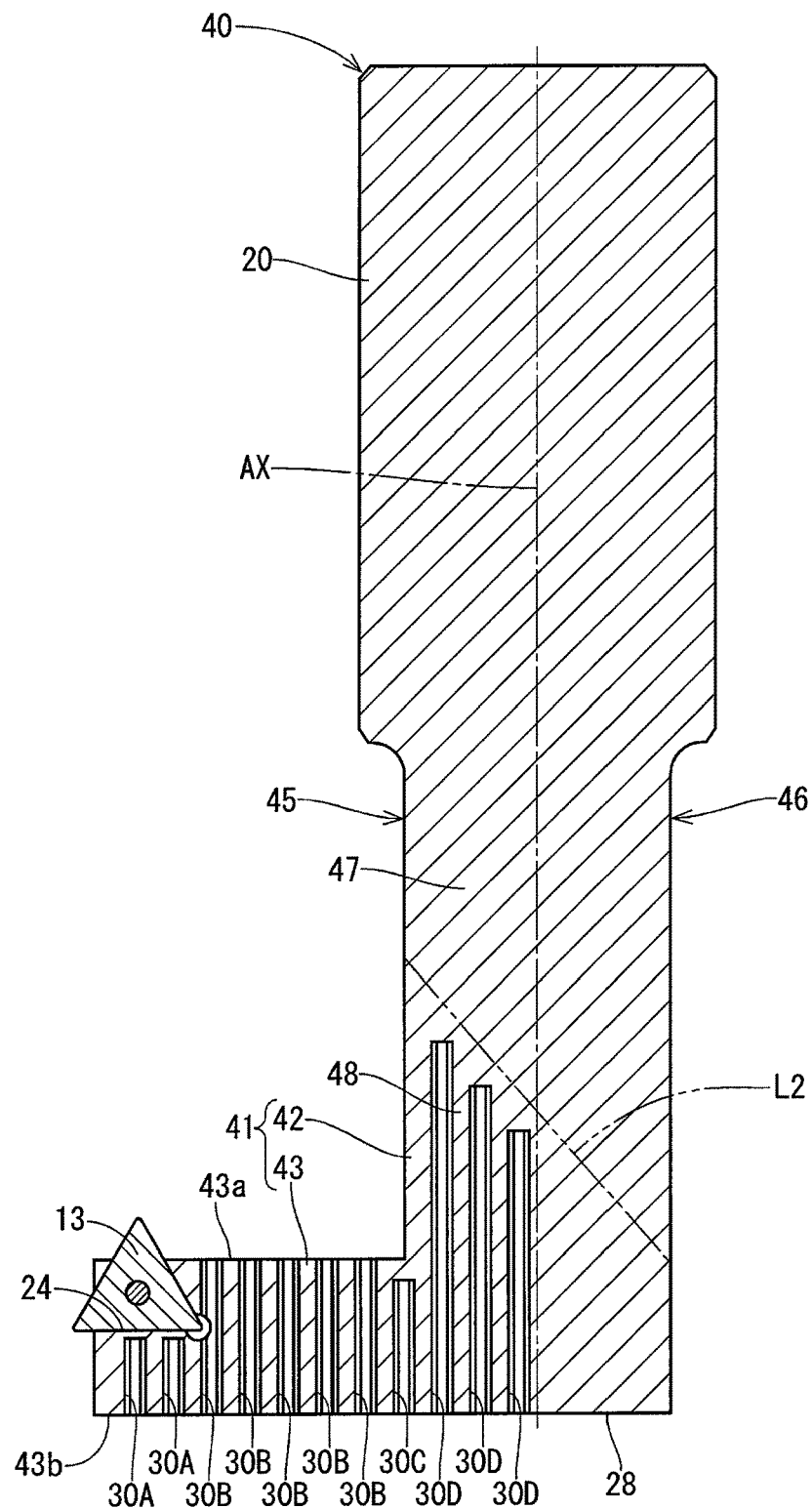
FIG. 7 is a longitudinal cross-sectional view illustrating a tool holder according to a second embodiment.

A second embodiment will be described hereafter referring to FIG. 7. A tool holder 40 of the second embodiment has the fixed part 20 and a cutting part 41. The cutting part 41 is formed using the 3D printer, and is an integrally-molded piece made of various materials. The cutting part 41 has a shaft 42 and a protruding part 43. The protruding part 43 has a first side surface 43a and a second side surface 43b facing each other in the axial direction. The shaft 42 has a part adjacent to the fixed part 20, and the part is made of a ferrous metal. The protruding part 43 and a part of the shaft 42 adjacent to the protruding part 43 are made of an aluminum material. A two-dot chain line L2 in FIG. 7 is a boundary line between the part made of the ferrous metal and the part made of the aluminum material. A one-side part 45 of the cutting part 41 has a bulk density that is smaller than a bulk density of an other-side part 46.

As a result, an actual center of gravity of the tool holder 40 on a condition of holding the cutting tool 13 is located closer to the rotational axis AX as compared to a virtual center of gravity of the tool holder 40. Thus, the vibration of the tool holder 40 when the tool holder 40 rotates can be suppressed similar to the first embodiment.

Since the cutting part 41 is made of various materials, each portion can be made of an appropriate material. For example, a base portion of the shaft 42 may be made of a ferrous metal to increase stiffness thereof. The protruding part 43 and a tip part of the shaft 42 to which heat transfers from the cutting tool 13 easily may be made of an aluminum material to improve a heat releasing performance.

The shaft 42 has a part included in the one-side part 45. The part has a dense part 47 and a sparse part 48. A bulk density of the sparse part 48 is smaller than a bulk density of the dense part 47. A length of the sparse part 48 in the axial direction increases as being distanced away from the rotational axis AX.

Since the length of the sparse part 48 in the axial direction is not even as described above, the actual center of gravity of the tool holder 40 on the condition of holding the cutting tool 13 can be set to be located closer to the rotational axis AX.

Third Embodiment

Figure 8:
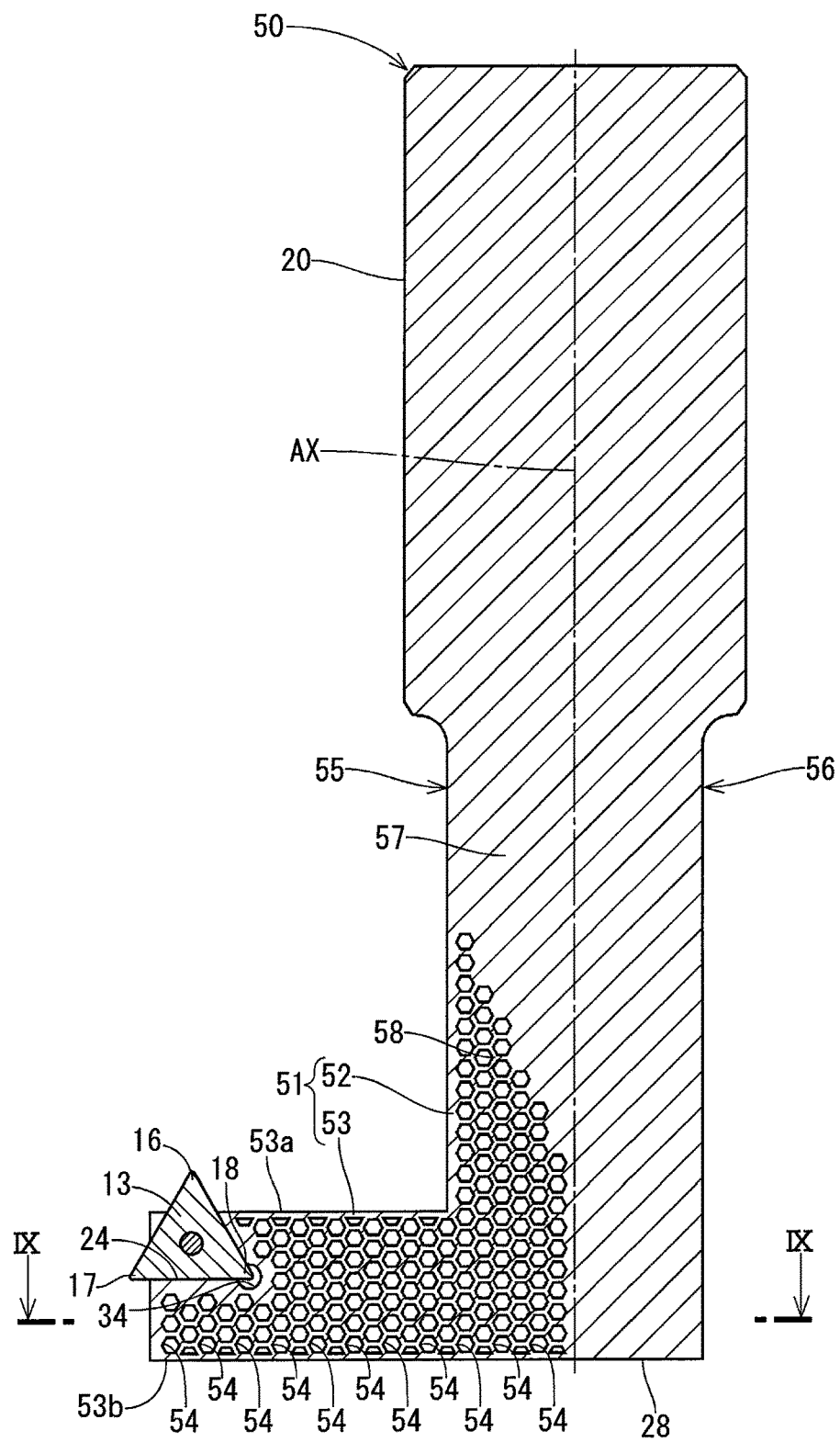
FIG. 8 is a longitudinal cross-sectional view illustrating a tool holder according to a third embodiment.
Figure 9:
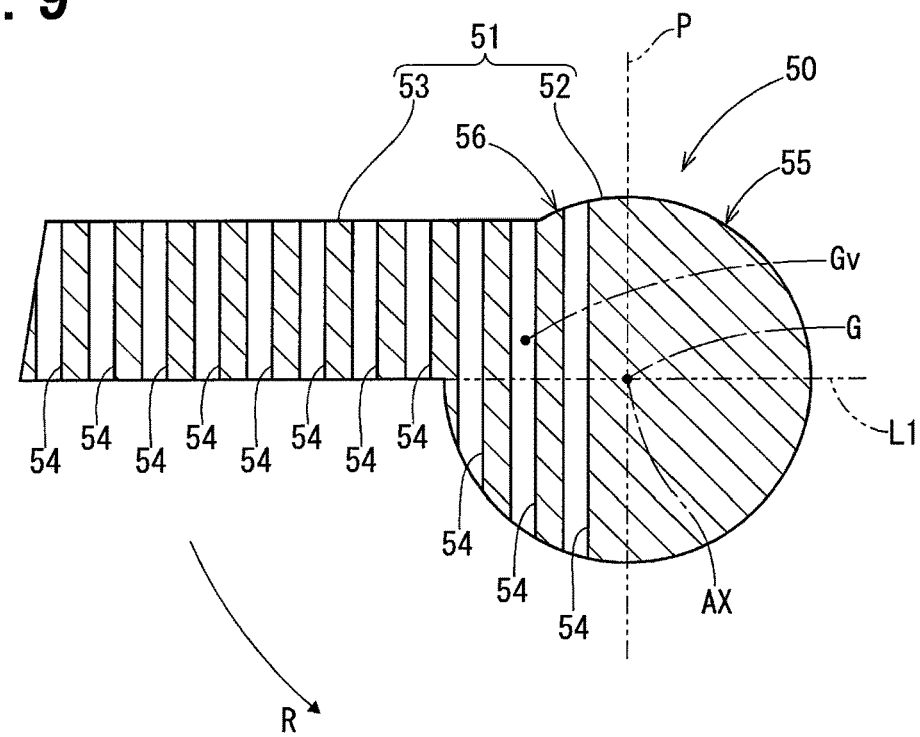
FIG. 9 is a cross-sectional view taken along a line IX-IX shown in FIG. 8.

A third embodiment will be described hereafter referring to FIG. 8 and FIG. 9. A tool holder 50 of the third embodiment has the fixed part 20 and a cutting part 51. The cutting part has a shaft 52 and a protruding part 53. The protruding part 53 has a first side surface 53a and a second side surface 53b facing each other in the axial direction. The cutting part 51 has a one-side part 55 that is provided with more than one of a hole 54 as "the balance adjustment hole". The cutting part 51 further has an other-side part 56, and a bulk density of the one-side part 55 is smaller than a bulk density of the other-side part 56.

As a result, an actual center G of gravity of the tool holder 50 on a condition of holding the cutting tool 13 is located closer to the rotational axis AX as compared to a virtual center Gv of gravity of the tool holder 40. Thus, the vibration of the tool holder 40 when the tool holder 40 rotates can be suppressed similar to the first embodiment.

The hole 54 is open in a rotational direction R of the tool holder 50 from a rotational rear side to a rotational front side in a cross section perpendicular to the rotational axis AX. Accordingly, outside air flows into the hole 54 when the tool holder 50 rotates. According to the present embodiment, the hole 54 is open in the rotational direction R from the rotational front side to the rotational rear side. That is, the hole 54 is a through hole.

A heat releasing performance of the cutting part 51 can be improved by providing the hole 54 since air flows through the hole 54 when the tool holder 50 rotates.

The shaft 52 has a part included in the one-side part 55. The part has a dense part 57 and a sparse part 58. A bulk density of the sparse part 58 is smaller than a bulk density of the dense part 57. The sparse part 58 is provided with the hole 54. On the other hand, the dense part 57 is not provided with the hole 54. A length of the sparse part 58 in the axial direction increases as being distanced away from the rotational axis in the radial direction.

Since the length of the sparse part 58 in the axial direction is not even as described above, the actual center G of gravity of the tool holder 50 on the condition of holding the cutting tool 13 can be set to be located closer to the rotational axis AX as compared to the virtual center Gv of gravity.

According to the third embodiment, "the cutting edge cutting the workpiece" is the cutting edge 17. The cutting tool 13 is attached to the cutting part 51 such that the cutting edge 17 protrudes from the cutting part 51 in the radial direction. The hole 54 extends in a direction that is substantially coincides with a tangential direction of the rotational direction R of the tool holder 50, i.e., the direction of action in which load is applied to the cutting part 51 when cutting the workpiece 15.

That is, the cutting part 51 has the structure integrally provided with the hollow columns that extend in the direction substantially coincides with the direction of action in which the load is applied to the cutting part 21. As a result, a stiffness of the cutting part 51 for enduring the load can be increased.

Fourth Embodiment

Figure 10:
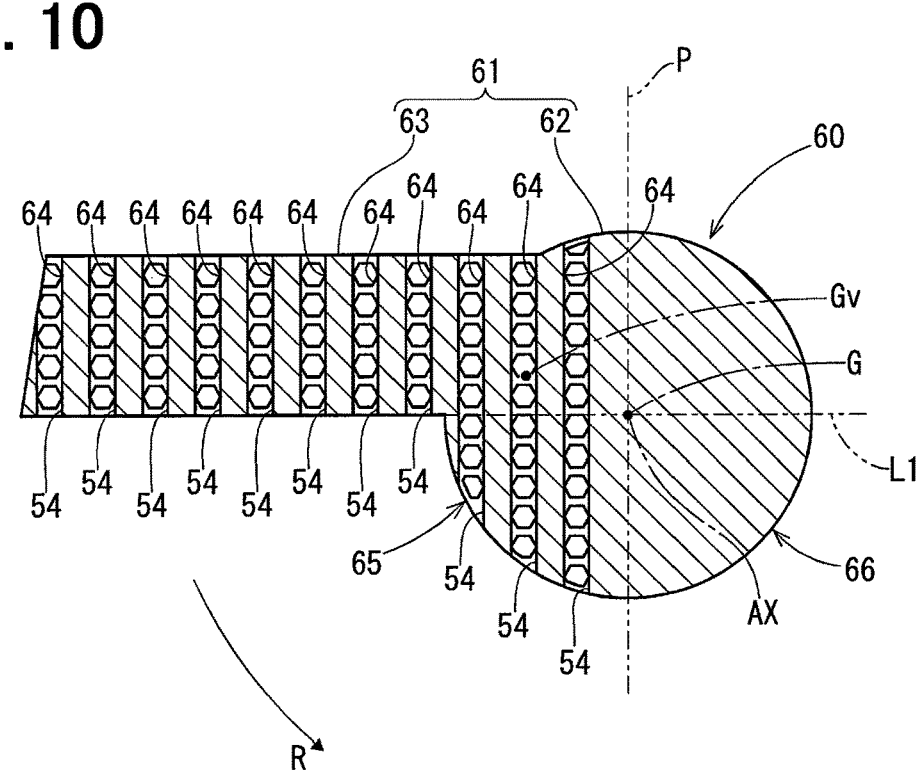
FIG. 10 is a transverse cross-sectional view illustrating a tool holder according to a fourth embodiment.

A fourth embodiment will be described hereafter referring to FIG. 10. A tool holder 60 of the fourth embodiment has the fixed part and a cutting part 61. The cutting part 61 has a shaft 62 and a protruding part 63. The cutting part 61 has a one-side part 65 provided with more than one of the holes 54 and more than one of a hole 64 as "the balance adjustment holes". The cutting part 61 further has an other-side part 66. A bulk density of the one-side part 65 is smaller than a bulk density of the other-side part 66.

As a result, an actual center G of gravity of the tool holder 60 on a condition of holding the cutting tool 13 is located closer to the rotational axis AX as compared to a virtual center Gv of gravity of the tool holder 60. Thus, the vibration of the tool holder 40 when the tool holder 40 rotates can be suppressed similar to the first embodiment.

The hole 64 is provided such that a direction in which the hole 64 extends intersects with the direction in which the hole 54 extends. That is, the hole 54 and the hole 64 are coupled with each other.

A surface area of the cutting part 61 being in contact with air increases as compared to that of the third embodiment by providing the hole 54 and the hole 64. In addition, a quantity of a path through which air flowing into the cutting part 61 flows to an outside of the cutting part 61 is increased. Therefore, a heat releasing performance of the cutting part 61 can be further improved.

Fifth Embodiment

Figure 11:
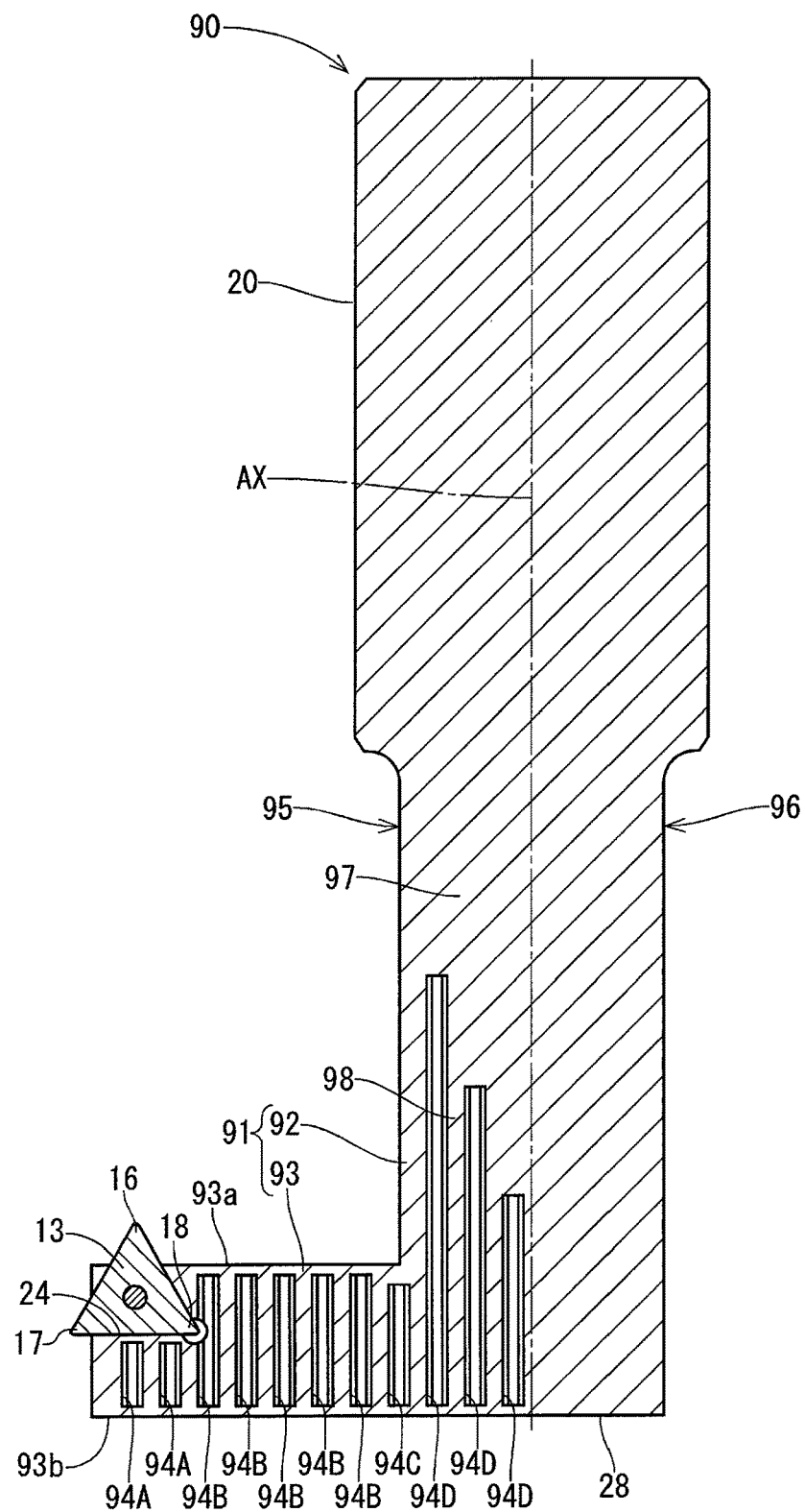
FIG. 11 is a longitudinal cross-sectional view illustrating a tool holder according to a fifth embodiment.

A fifth embodiment will be described hereafter referring to FIG. 11. A tool holder 90 of the fifth embodiment has the fixed part 20 and a cutting part 91. The cutting part 91 has a shaft 92 and a protruding part 93. The protruding part 93 has a first side surface 93a and a second side surface 93b facing each other in the axial direction. The protruding part 93 further has the recessed part 24 similar to the first embodiment. The cutting part 91 has a one-side part 95 provided with an enclosed void 94A, an enclosed void 94B, an enclosed void 94C, and an enclosed void 94D as "the balance adjustment hole". The enclosed void 94A is located in a tip part of the protruding part 93 on the rotational front side in the rotational direction R and on the side of the recessed part 24 opposite to the fixed part 20 in the axial direction. The enclosed void 94B is located in a rotational rear area of the protruding part 93 in the rotational direction R, an intermediate area of the protruding part 93 in the rotational direction R, and a bottom area of the protruding part 93. The enclosed void 94C is provided in a boundary area between the shaft 92 and the protruding part 93. The closed 94D is provided in a part of the shaft 92 included in a one-side part 95. The cutting part 91 further has an other-side part 96. A bulk density of the one-side part 95 is smaller than a bulk density of the other-side part 96.

As a result, an actual center G of gravity of the tool holder 90 on a condition of holding the cutting tool 13 is located closer to the rotational axis AX as compared to a virtual center Gv of gravity of the tool holder 90. Thus, the vibration of the tool holder 40 when the tool holder 40 rotates can be suppressed similar to the first embodiment.

In the following descriptions, the enclosed voids 94A, 94B, 94C, 94D will collectively mean "a enclosed void 94" when it is not necessary to distinguish the enclosed voids 94A, 94B, 94C, 94D from each other. The enclosed void 94 is a hole extending in the axial direction and is not open on the outer surface (i.e., an inner wall surface of the recessed part 24, the first side surface 93a, the second side surface 93b, and the end surface 28). That is, the enclosed void 94 is closed to outside. The cutting part 91 having the closed void is not formed by cutting work, however can be formed using the 3D printer easily. The enclosed void 94 is formed simultaneously with the cutting part 91 by using the 3D printer.

According to the fifth embodiment, since the hole closed to outside is provided, a corrosion occurring inside of the tool holder 90 can be suppressed as compared to a case where the one-side part 95 of the cutting part 91 is provided with a hole that is open on the outer surface of the one-side part 95.

The shaft 92 has a part included in the one-side part 95. The part has a dense part 97 and a sparse part 98. A bulk density of the sparse part 98 is smaller than a bulk density of the dense part 97. The sparse part 98 is provided with the enclosed void 94D. On the other hand, the dense part 97 is not provided with the enclosed void 94D. A length of the sparse part 98 in the axial direction increases as being distanced away from the rotational axis AX in the radial direction.

Since the length of the sparse part 98 in the axial direction is not even as described above, the actual center G of gravity of the tool holder 90 on the condition of holding the cutting tool 13 can be set to be located closer to the rotational axis AX as compared to the virtual center Gv of gravity.

According to the fifth embodiment, "the cutting edge cutting the workpiece" is the cutting edge 16. The cutting tool 13 is attached to the cutting part 91 such that the cutting edge 16 protrudes from the cutting part 91 in the axial direction. The enclosed void 94 extends in a direction that is substantially coincides with the axial direction, i.e., the direction of action in which load is applied to the cutting part 91 when cutting the workpiece 15.

That is, the cutting part 91 has the structure integrally provided with the hollow columns that extend in the direction substantially coincides with the direction of action in which the load is applied to the cutting part 91. As a result, a stiffness of the cutting part 91 for enduring the load can be increased.

In addition, more than one of the enclosed void 94A and more than one of the enclosed void 94B, which is provided in the tip part of the protruding part 93, are located to be adjacent to the cutting tool 13 so as to release heat transmitted from the cutting tool 13 to the cutting part 91. As a result, a heat releasing performance of the cutting part 91 can be improved.

Sixth Embodiment

Figure 12:
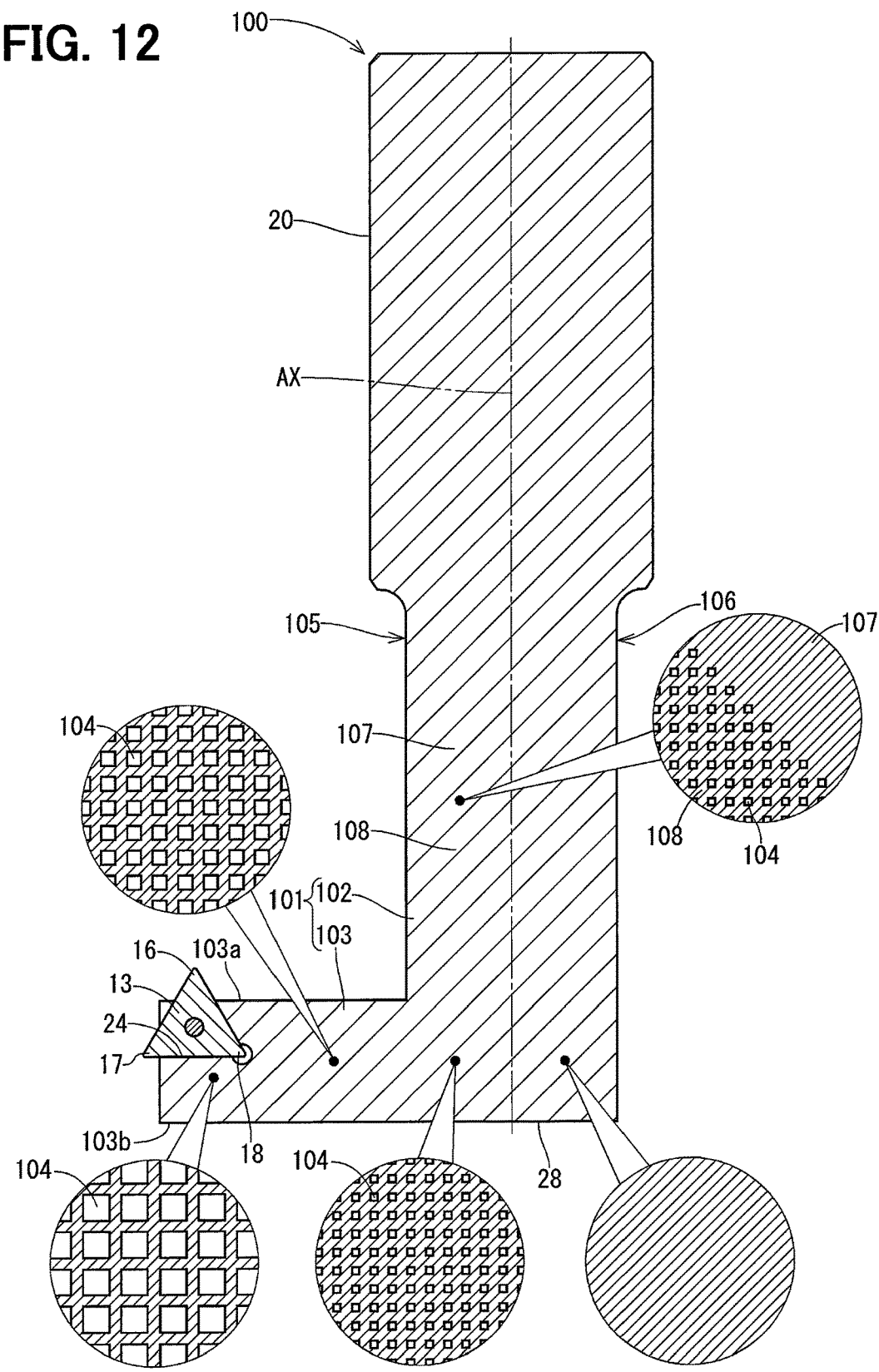
FIG. 12 is a longitudinal cross-sectional view illustrating a tool holder according to a sixth embodiment.

A sixth embodiment will be described hereafter referring to FIG. 12. A tool holder 100 of the sixth embodiment has the fixed part 20 and a cutting part 101. The cutting part 101 has a shaft 102 and a protruding part 103. The protruding part 103 has a first side surface 103a and a second side surface 103b facing each other in the axial direction. The cutting part 101 has a one-side part 105 that is formed using the 3D printer to have a grid structure. Enlarged portions of the one-side part 105 are illustrated in FIG. 12. A grid dimension increases as being distanced away from the rotational axis AX.

An enclosed void 104 is provided in each grid of the one-side part 105. A void ratio of the one-side part 105 increases as being distanced away from the rotational axis AX. The void ratio is, i.e., a ratio of the void per unit volume. The cutting part 101 further has an other-side part 106. Since the one-side part 105 has the enclosed void 104, a bulk density of the one-side part 105 is smaller than a bulk density of the other-side part 106. In addition, the bulk density of the one-side part 105 decreases as being distanced away from the rotational axis AX in the radial direction.

As a result, an actual center G of gravity of the tool holder 100 on a condition of holding the cutting tool 13 is located closer to the rotational axis AX as compared to a virtual center Gv of gravity of the tool holder 100. Thus, the vibration of the tool holder 40 when the tool holder 40 rotates can be suppressed similar to the first embodiment.

The enclosed void 104 of the sixth embodiment is closed to outside. As a result, an inside of the tool holder 100 is not corroded as compared to a case where the one-side part 105 of the cutting part 101 is provided with a hole that is open on the outer surface of the one-side part 105.

The shaft 102 has a part included in the one-side part 105. The part has a dense part 107 and a sparse part 108. A bulk density of the sparse part 108 is smaller than a bulk density of the dense part 107. The sparse part 108 is provided with the enclosed void 104. On the other hand, the dense part 107 is not provided with the enclosed void 104. A length of the sparse part 108 in the axial direction increases as being distanced away from the rotational axis AX in the radial direction.

Since the length of the sparse part 108 in the axial direction is not even as described above, the actual center G of gravity of the tool holder 100 on the condition of holding the cutting tool 13 can be set to be located closer to the rotational axis AX as compared to the virtual center Gv of gravity.

Seventh Embodiment

Figure 13:
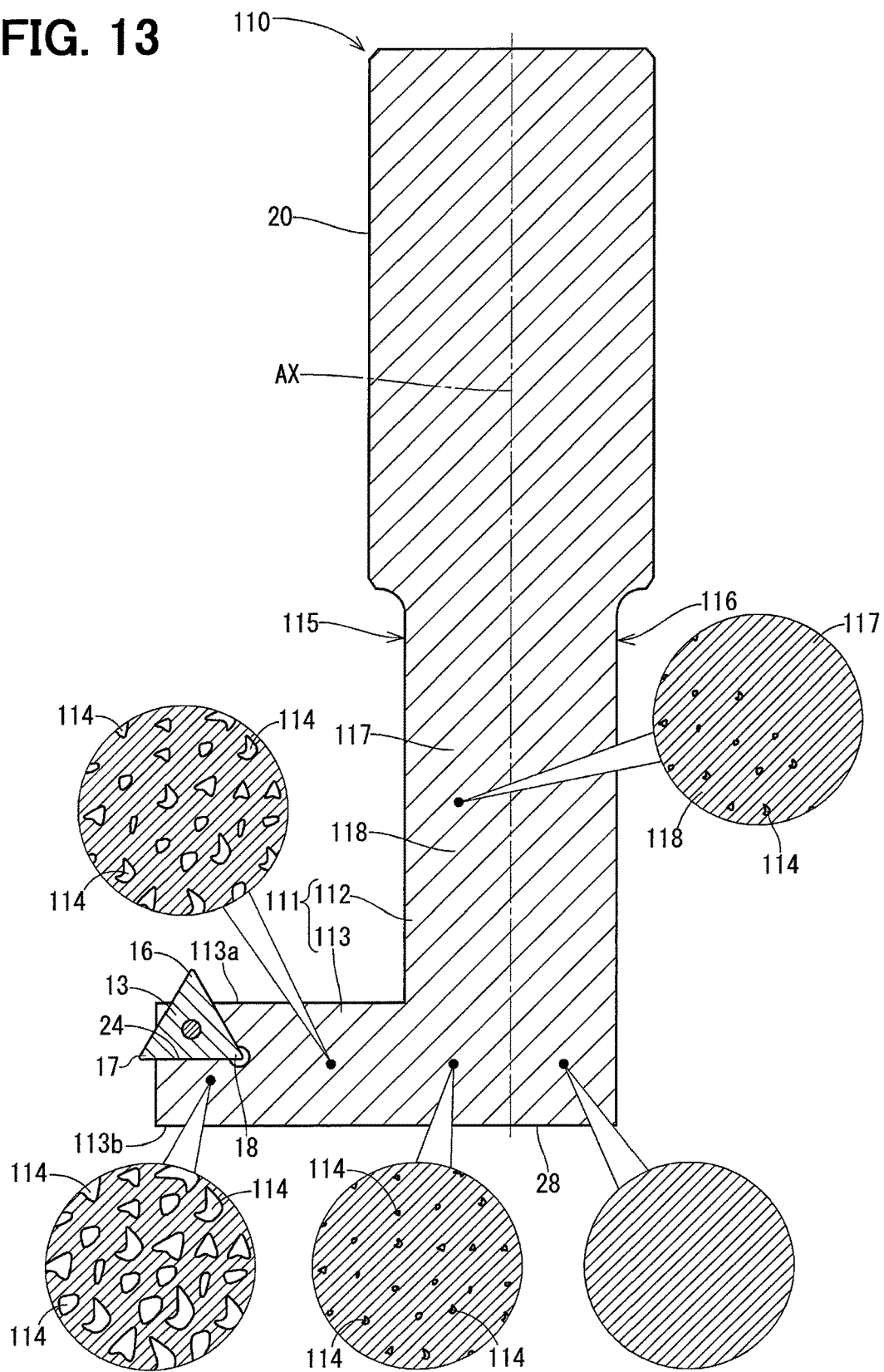
FIG. 13 is a longitudinal cross-sectional view illustrating a tool holder according to a seventh embodiment.
Figure 14:
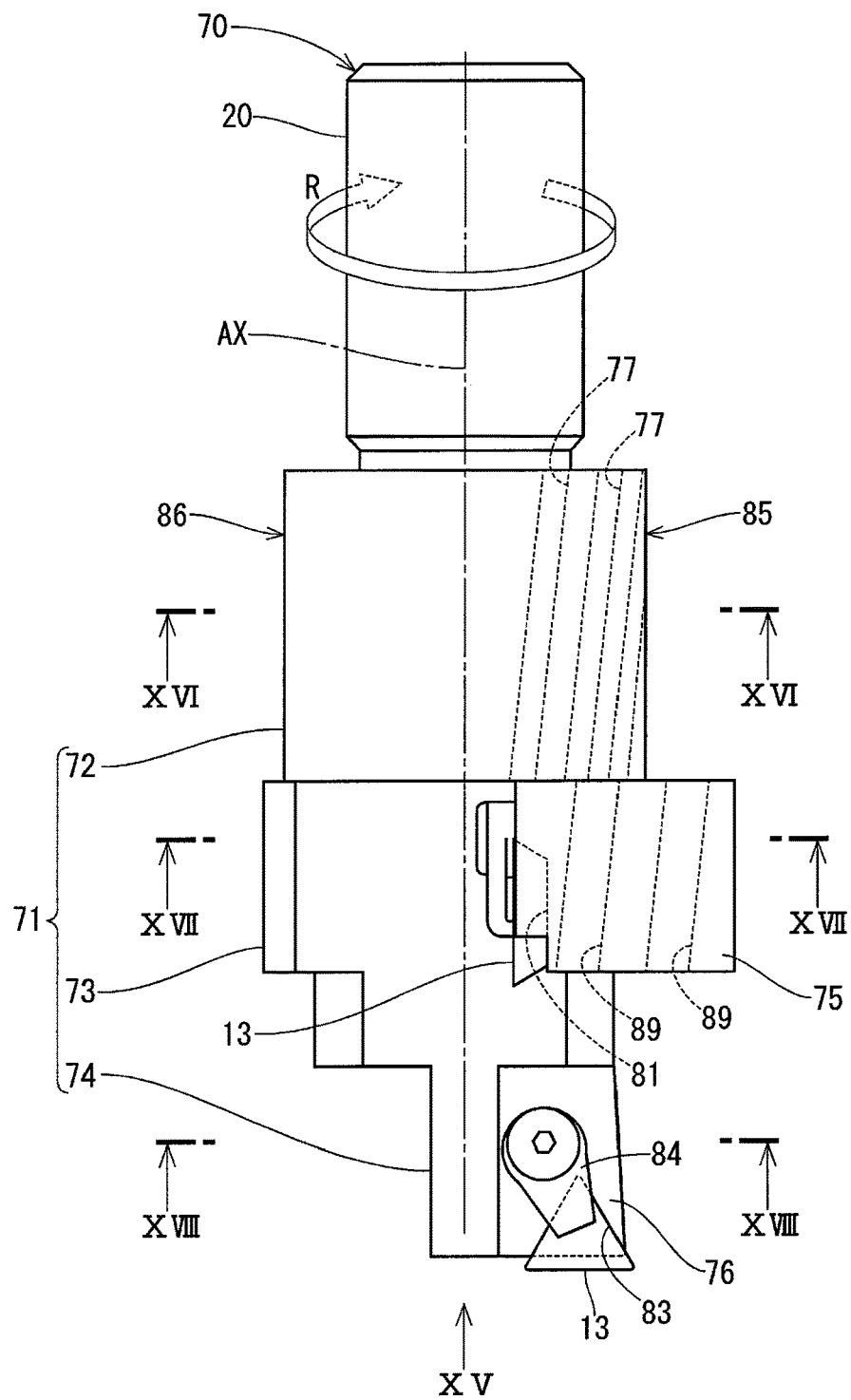
FIG. 14 is a diagram illustrating an exterior of a tool holder on a condition of holding a cutting tool, according to an eighth embodiment.

A seventh embodiment will be described hereafter referring to FIG. 13. A tool holder 110 of the seventh embodiment has the fixed part 20 and a cutting part 111. The cutting part 111 has a shaft 112 and a protruding part 113. The protruding part 113 has a first side surface 113a and a second side surface 113b facing each other in the axial direction. The cutting part 111 has a one-side part 115. The one-side part 115 is formed using the 3D printer and therein has an enclosed void 114 having a bubble shape. The void ratio of the one-side part 115 increases as being distanced from the rotational axis AX. The cutting part 111 further has an other-side part 116. Since the one-side part 115 has the enclosed void 114, a bulk density of the one-side part 115 is smaller than a bulk density of the other-side part 116. In addition, the bulk density of the one-side part 115 decreases as being distanced away from the rotational axis AX in the radial direction.

The tool holder 110 has the same configuration as the tool holder 100 of the sixth embodiment except for a point that the enclosed void 114 has the bubble shape. Thus, according to the seventh embodiment, a similar effect as the sixth embodiment can be acquired.

Eighth Embodiment

An eighth embodiment will be described hereafter referring to FIG. 14 to FIG. 18. A tool holder 70 of the eighth embodiment has the fixed part 20 and a cutting part 71. Two cutting tools 13 are attached to the cutting part 71.

The cutting part 71 has a base portion 72, a tool attachment portion 73, and a tool attachment portion 74 that are arranged in this order from the fixed part 20. The tool attachment portions 73, 74 are located at different locations in the axial direction.

Figure 15:
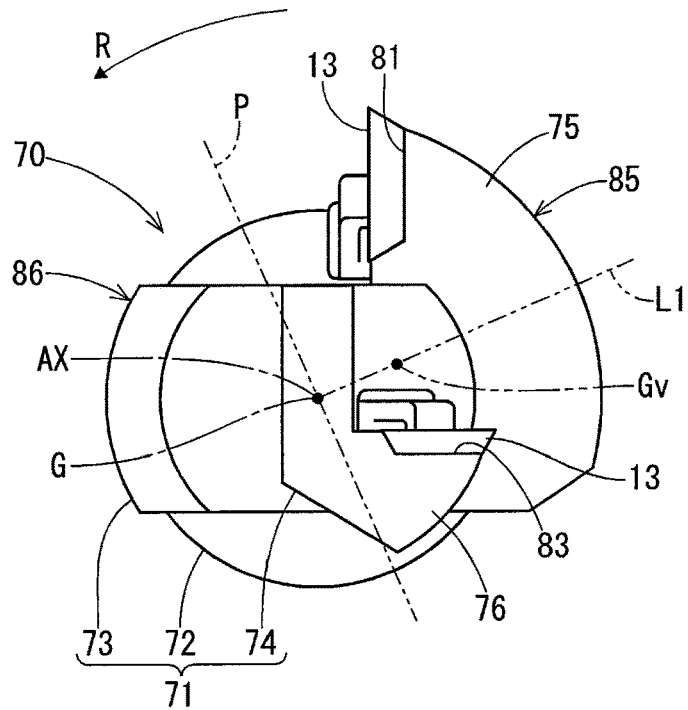
FIG. 15 is a diagram illustrating the tool holder when viewed from a direction XV shown in FIG. 14.
Figure 16:
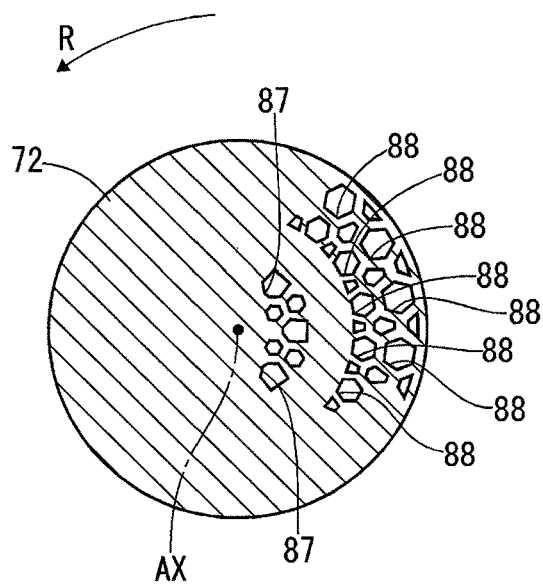
FIG. 16 is a cross-sectional view taken along a line XVI-XVI shown in FIG. 14.
Figure 17:
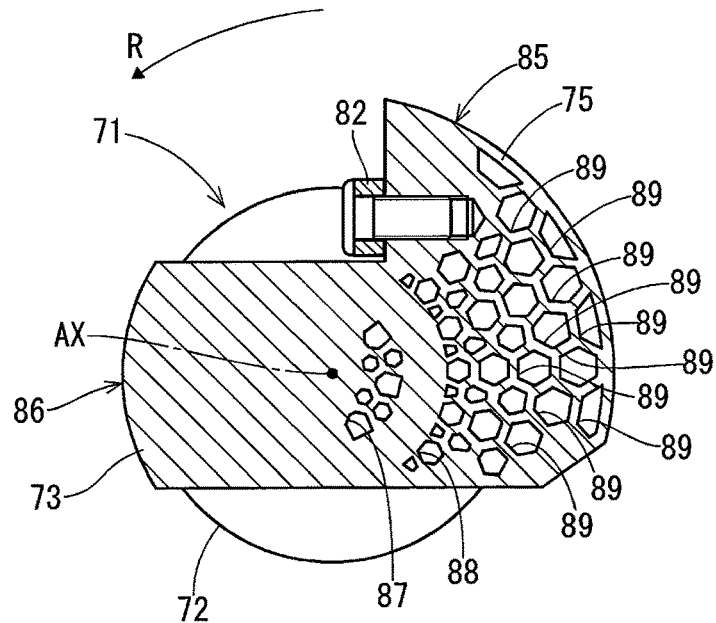
FIG. 17 is a cross-sectional view taken along a line XVII-XVII shown in FIG. 14.
Figure 18:
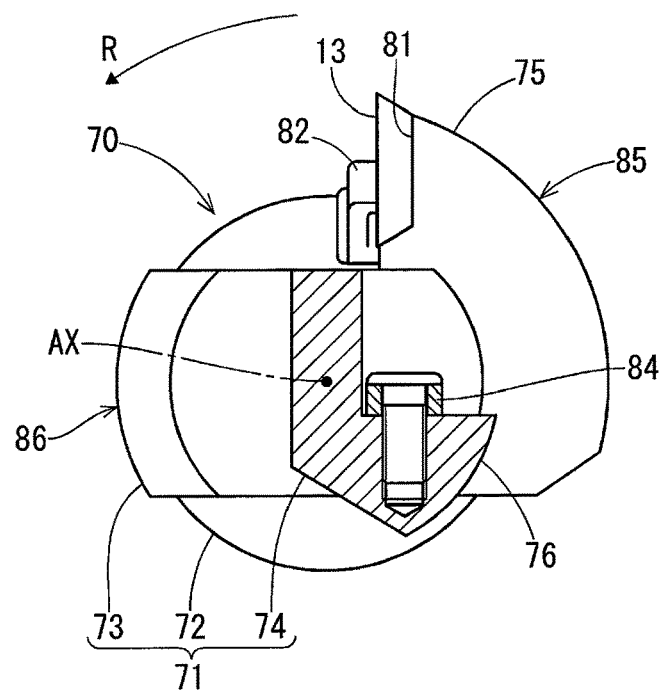
FIG. 18 is a cross-sectional view taken along a line XVIII-XVIII shown in FIG. 14.

The tool attachment portion 73 has a protruding part 75 protruding outward in the radial direction. As shown in FIG. 15, the protruding part 74 has a wall on the rotational front side in the rotational direction R, and the wall is provided with a recessed part 81. The cutting tool 13 fits to the recessed part 81. The cutting tool 13 is located between a bottom of the recessed part 81 and a fixing member 82 and is fixed by the fixing member 82.

The tool attachment portion 74 has a protruding part 76 protruding outward in the radial direction. The protruding part 76 has a wall on the rotational front side in the rotational direction R, and the wall is provided with a recessed part 83. The cutting tool 13 fits to the recessed part 83. The cutting tool 13 is located between a bottom of the recessed part 83 and a fixing member 84 and is fixed by the fixing member 84.

The cutting tool 13 is positioned to protrude toward one side with respect to the rotational axis AX in the radial direction. The tool attachment portions 73, 74 have the protruding parts 75, 76 respectively to correspond to an arrangement of the cutting tool 13. As a result, each of the tool attachment portions 73, 74 is asymmetric with respect to the rotational axis AX.

The cutting part 71 has a one-side part 85 that is provided with an enclosed void 87 and holes 88, 89 as "the balance adjustment holes". The enclosed void 87 is provided in an inner periphery of the base portion 72 to extend from the base portion 72 to the tool attachment portion 73, and is closed to outside. The hole 88 is provided in an outer periphery of the base portion 72 to extend from the base portion 72 to the tool attachment portion 73. An end of the hole 88 adjacent to the fixed part 20 is open on an outer surface of the base portion 72. The hole 89 is provided in an outer periphery of the tool attachment portion 73 to pass through the tool attachment portion 73.

The cutting part 71 further has an other-side part 86. Since the one-side part 85 has the enclosed void 87 and the holes 88, 89, a bulk density of the one-side part 85 is smaller than a bulk density of the other-side part 86. As a result, an actual center G of gravity of the tool holder 70 on a condition of holding the cutting tool 13 is located closer to the rotational axis AX as compared to a virtual center Gv of gravity of the tool holder 70. Thus, the vibration of the tool holder 40 when the tool holder 40 rotates can be suppressed similar to the first embodiment.

The enclosed void 87 and the holes 88, 89 are provided helically around the rotational axis AX and have one ends located away from the fixed part 20 and other ends located adjacent to the fixed part 20. The one ends are located on a front side of the other ends in the rotational direction R respectively. As a result, stiffness of the cutting part 71 for enduring the load applied to the cutting part 71 when cutting the workpiece 15 is increased as compared to a case where the enclosed void and the holes are provided to extend straight in the axial direction.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

As a modification, the hole and the enclosed void may be provided to extend from the fixed part through the cutting part. That is, the balance adjustment holes may be provided in the fixed part not only in the cutting part.

As a modification, the hole and the enclosed void may be provided in the other-side part not only in the one-side part.

As a modification, the sparse part provided in the one-side part of the cutting part may have the same length in the axial direction from one end to an other end of the sparse part in the radial direction.

As a modification, the hole and the enclosed void may have a shape, other than the hexagonal shape, such as a round shape, an ellipse shape, or a rectangular shape in the transverse cross section.

As a modification, the hole and the enclosed void is not limited to extend straight and may be curved, or may have a straight part and a curved part.

As a modification, the part of the cutting part provided with the hole and the enclosed void is not limited to have the honeycomb structure.

According to the second embodiment, the tool holder is the integrally-molded piece made of a ferrous metal and an aluminum material. However, the tool holder may be an integrally-molded piece made of another combination of materials.

According to the third embodiment, the cutting part has the hole passing through the cutting part in the tangential direction of the rotational direction R. However, the cutting part may have an enclosed void being closed to outside. The enclosed void may extend in the tangential direction of the rotational direction R and is not open on an outer surface of the cutting part.

According to the sixth and seventh embodiments, the cutting part has the enclosed void being closed to outside. However, the enclosed void of the sixth and seventh embodiments may be a void being open on the outer surface partially.

According to the fifth, sixth, and seventh embodiments, the enclosed void provided in the cutting part is hollow. However, metal powder, which is not melted when molding the cutting part by the powder sintering, may be located inside the enclosed void.

As a modification, the balance adjustment holes may include three or more through holes intersecting with each other. According to this configuration, the heat releasing performance may be further improved.

As a modification, the tool holder may be formed using the 3D printer with a method other than the powder sintering.

As a modification, the tool holder may be used for performing a boring and may be used for performing other processes.

What is claimed is:

1. A tool holder that holds a cutting tool, the cutting tool that cuts a workpiece while revolving about a rotational axis, the tool holder comprising:
   a fixed part that is held by a main shaft of a machine tool; and
   a cutting part that is provided integrally with the fixed part and has an asymmetric shape with respect to the rotational axis, the cutting tool being attached to the cutting part, wherein
   the cutting part has a one-side part and an other-side part, the one-side part having a largest protruding amount from the rotational axis in the cutting part when viewed from an axial direction, the other-side part being located on a side of the rotational axis opposite to the one-side part,
   a bulk density of the one-side part is smaller than a bulk density of the other-side part and decreases as being distanced away from the rotational axis in a radial direction; and the one-side part of the cutting part has a plurality of enclosed voids being closed to outside.

2. The tool holder according to claim 1, wherein the cutting part has
a shaft and
a protruding part that protrudes outward from the shaft in the radial direction,
the shaft has a part included in the one-side part of the cutting part, the part of the shaft having
a dense part and
a sparse part that has a smaller bulk density as compared to the dense part, and
a length of the sparse part in the axial direction increases as being distanced away from the rotational axis in the radial direction.

3. The tool holder according to claim 1, wherein
the cutting tool has a cutting edge cutting the workpiece and is attached to the cutting part such that the cutting edge protrudes from the cutting part in the axial direction, and
the plurality of enclosed voids extend in the axial direction.

4. The tool holder according to claim 1, wherein
the cutting tool has a cutting edge cutting the workpiece and is attached to the cutting part such that the cutting edge protrudes from the cutting part in the radial direction, and
the plurality of enclosed voids extend in a tangential direction of a rotational direction of the tool holder.

5. The tool holder according to claim 1, wherein
at least one of the plurality of enclosed voids is located adjacent to the cutting tool so as to release heat transmitted from the cutting tool to the cutting part.

6. The tool holder according to claim 1, wherein
the one-side part of the cutting part has a plurality of holes that are open on an outer surface of the one-side part.

7. The tool holder according to claim 6, wherein
the plurality of holes are open in a rotational direction of the tool holder from a rotational rear side to a rotational front side.

8. The tool holder according to claim 6, wherein
the cutting tool has a cutting edge cutting the workpiece and is attached to the cutting part such that the cutting edge protrudes from the cutting part in the radial direction, and
the plurality of holes extend in a tangential direction of the rotational direction of the tool holder.

9. The tool holder according to claim 6, wherein
at least one of the plurality of holes is located adjacent to the cutting tool so as to release heat transmitted from the cutting tool to the cutting part.

10. A tool holder that holds a cutting tool, the cutting tool that cuts a workpiece while revolving about a rotational axis, the tool holder comprising:
a fixed part that is held by a main shaft of a machine tool; and
a cutting part that is provided integrally with the fixed part and has an asymmetric shape with respect to the rotational axis, the cutting tool being attached to the cutting part, wherein
the cutting part has a one-side part and an other-side part, the one-side part having a largest protruding amount from the rotational axis in the cutting part when viewed from an axial direction, the other-side part being located on a side of the rotational axis opposite to the one-side part,
a bulk density of the one-side part is smaller than a bulk density of the other-side part and decreases as being distanced away from the rotational axis in a radial direction,
the one-side part of the cutting part has a plurality of holes that are open on an outer surface of the one-side part,
the cutting tool has a cutting edge cutting the workpiece and is attached to the cutting part such that the cutting edge protrudes from the cutting part in the axial direction, and
the plurality of holes extend in the axial direction.

* * * * *